(12) United States Patent
Minkovich et al.

(10) Patent No.: US 9,275,328 B1
(45) Date of Patent: Mar. 1, 2016

(54) NEUROMORPHIC COMPILER

(71) Applicant: HRL Laboratories, LLC, Malibu, CA (US)

(72) Inventors: Kirill Minkovich, Campbell, CA (US); Aleksey Nogin, Fresno, CA (US); Yougkwan Cho, Los Angeles, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 330 days.

(21) Appl. No.: 13/886,263

(22) Filed: May 2, 2013

Related U.S. Application Data (60) Provisional application No. 61/642,029, filed on May 3, 2012.

(51) Int. Cl.
- *G06F 15/18* (2006.01)
- *G06E 3/00* (2006.01)
- *G06N 3/04* (2006.01)

(52) U.S. Cl.
CPC .................................... *G06N 3/04* (2013.01)

(58) Field of Classification Search
None
See application file for complete search history.

(56) References Cited

U.S. PATENT DOCUMENTS

| | | | |
|---|---|---|---|
| 5,274,748 | A | 12/1993 | Boser et al. |
| 2007/0198971 | A1* | 8/2007 | Dasu et al. .................... 717/140 |
| 2010/0017774 | A1* | 1/2010 | Bachina et al. ................ 716/16 |

OTHER PUBLICATIONS

Emery et al. "Connection-Centric Network for Spiking Neural Networks", IEEE, 2009, 9 pages.*
Tuffy et al., "A Time Multiplexing Architecture for Inter-neuron Communications", ICANN 2006, pp. 944-952.*
Farahmand et al. "Hardware Implementation of the Shortest Drop Policy for Slotted Optical Burst Switching Networks", 2003, 5 pages, http://www.researchgate.net/profile/Farid_Farahmand2/publication/228695023_Hardware_Implementation_of_the_Shortest_Drop_Policy_for_Slotted_Optical_Burst_Switching_Networks/links/09e4150ac1f7a4d.*
Bailey et al., "Why VLSI implementation of associative VLCNs require connection multiplexing," in Proc. IEEE Int. Conf. Neural Netw., San Diego, CA, Jul. 1988, pp. 173-180.
Strukov et al., "Prospects for terabit-scale nanoelectronic memories," Nanotechnology, vol. 16, No. 1, pp. 137-148, 2005.
Jo et al., "Nanoscale memristor device as synapse in neuromorphic systems," Nano Lett., vol. 10, No. 4, pp. 1297-1301, 2010.
Gao et al., "Cortical models onto CMOL and CMOS architectures and performance/price," IEEE Trans. Circuits Syst. I, Reg. Papers, vol. 54, No. 11, pp. 2502-2515, Nov. 2007.
Partzsch et al., "Analyzing the scaling of connectivity in neuromorphic hardware and in models of neural networks," IEEE Trans. Neural Netw., vol. 22, No. 6, pp. 919-935, Jun. 2011.

(Continued)

*Primary Examiner* — Li-Wu Chang
(74) *Attorney, Agent, or Firm* — North Shore Associates (57) ABSTRACT

A neuromorphic compiler includes a placement module to provide analytic placement of neurons in a neural network description. The analytic placement is to produce placed neurons. The neuromorphic compiler further includes a smoothing module to perform diffusion-based smoothing of the placed neurons; a legalization module to adjust locations of the placed neurons to correspond to legal locations of neuromorphic neurons within a neural fabric; and a simulated annealing module to refine locations of the placed neurons within the neural fabric using simulated annealing following location adjustment by the legalization module. The neural fabric is to implement a synaptic time-multiplexed (STM) neuromorphic network.

22 Claims, 4 Drawing Sheets

(56) References Cited

OTHER PUBLICATIONS

Indiveri et al., "Neuromorphic silicon neuron circuits," Frontiers Neurosci., vol. 5, No. 73, pp. I-23, 2011.
Srinivasa et al., "Analog learning systems of neuromorphic adaptive plastic scalable electronics," IEEE Pulse, vol. 3, No. 1, pp. 51-56, Jan.-Feb. 2012.
Markram et al., "Regulation of synapticefficacy by coincidence of postsynaptic APs and EPSPs," Sci. Mag., vol. 2, vol. 75, pp. 213-215, 1997.
Bi et al., "Activity-induced synaptic modifications in hippocampal culture: Dependence on spike timing, synaptic strength and cell type," J. Neurosci. vol. 18, No. 24, pp. 10464-10472, 1998.
Izhikevich, "Polychronization: Computation with spikes," Neural Comput., vol. 18, No. 2, pp. 245-282, 2006.
Izhikevich et al., "Spike-timing Dynamics of Neuronal Groups," Cerebral Cortex, vol. 14, No. 8, pp. 933-944, 2004.
Vogels et al., "Neural network dynamics," Annu. Rev. Neurosci., vol. 28, pp. 357-376, Jul. 2005.
Chen et al., "Real-time simulation of biologically realistic stochastic, neurons in VLSI," IEEE Trans. Neural Netw., vol. 21, No. 9, pp. 1511-1517, Sep. 2010.
Sharma et al., "Accelerating FPGA routing using architecture-adaptive A* techniques," in Proc. IEEE Int. Field-Program. Technol. Conf., Dec. 2005, pp. 225-232.
Kim et al., "A functional hybrid memristor crossbar-array/cmos system for data storage and neuromorphic applications," Nano Lett., vol. 12, No. 1, pp. 389-395, 2012.
Wheeler et al., "CMOS integrated memristors for neuromorphic architectures," in Proc. Int. Semicond. Device Res. Symp., Dec. 2011, pp. 1-2.
Merolla et al., "Expandable networks for neuromorphic chips," IEEE Trans. Circuits Syst. I, vol. 54, No. 2, pp. 301-311, Feb. 2007.
Khan et al, "SpiNNaker: Mapping neural networks onto a massively-parallel chip multiprocessor," in Proc. IEEE Int. Joint Conf. Neural Netw. World Congr. Comput. Intell., Jun. 2008, pp. 2849-2856.
Schemmel et al., "Implementing synaptic plasticity in a VLSI spiking neural network model," in Proc. Int. Joint Conf. Neural Netw., 2006, pp. 1-6.
Schemmel et al., "A wafer-scale neuromorphic hardware system for large-scale neural modeling," in Proc. IEEE Int. Symp. Circuits Syst., May-Jun. 2010, pp. 1947-1950.
Serrano-Gotarredona et al., "CAVIAR: A 45k neuron, 5M synapse, 12G connects/s AER hardware sensory-processing-learning-actuating system for high-speed visual object recognition and tracking," IEEE Trans. Neural Netw., vol. 20, No. 9, pp. 1417-1438, Sep. 2009.
Indiveri et al., "Frontiers in neuromorphic engineering," Frontiers Neurosci., vol. 5, No. 118, pp. 1-2, 2011. [27] M. Mahowald, "VLSI analogs of neuronal visual processing: A synthesis of form and function," Ph.D. dissertation, Dept. Comput. Neural Syst., California Inst. Technol., Pasadena, 1992.
Boahen, "A burst-mode word-serial address-event link-I: Transmitter design," IEEE Trans. Circuits Syst. I, vol. 51, No. 7, pp. 1269-1280, Jul. 2004.
Boahen, "A burst-mode word-serial address-event link-II: Receiver design," IEEE Trans. Circuits Syst. I, vol. 51, No. 7, pp. 1281-1291, Jul. 2004.
Boahen, "Point-to-point connectivity between neuromorphic chips using address events," IEEE Trans. Circuits Syst. II, vol. 47, No. 5, pp. 416-434, May 2000.
Indiveri et al., "A reconfigurable neuromorphic VLSI multichip system applied to visual motion computation," in Proc. 7th Int. Conf. Microelectron. Neural, Fuzzy Bio-Inspired Syst., 1999, pp. 37-44.
Luu et al., "VPR 5.0: FPGA cad and architecture exploration tools with singledriver routing, heterogeneity and process scaling," in Proc. ACM/SIGDA Int. Symp. Field Program. Gate Arrays, 2009, pp. 1-10.
Viswanathan et al., "FastPlace 3.0: A fast multilevel quadratic placement algorithm with placement congestion control," in Proc. Asia South Pacific Design Autom. Conf., Jan. 2007, pp. 135-140.
Padmini et al., "Architecture-aware FPGA placement using metric embedding," in Proc. 43rd Annu. Design Autom. Conf., 2006, pp. 1-6.
Dehon, "Balancing interconnect and computation in a reconfigurable computing array," in Proc. ACM/SIGDA 7th Int. Symp. Field Program. Gate Arrays, 1999, pp. 1-10.
Achard et al., "A resilient, low-frequency, small-world human brain functional network with highly connected association cortical hubs," J. Neurosci., vol. 26, pp. 63-72, Jan. 2006.
Dongarra et al., "A sparse matrix library in C++ for high performance architectures," in Proc. 2nd Object Oriented Numerics Conf., 1994, pp. 214-218.
Ren et al., "Diffusion-based placement migration," in Proc. 42nd Annu. Design Autom. Conf., 2005, pp. 1-6.
Hart et al., "A formal basis for the heuristic determination of minimum cost paths," IEEE Trans. Syst. Sci. Cybern., vol. 4, No. 2, pp. 100-107, Jul. 1968.
Huffman, "A method for the construction of minimum-redundancy codes," Proc. IRE, vol. 40, No. 9, pp. 1098-1102, Sep. 1952.
Welch, "A technique for high-performance data compression," IEEE Comput., vol. 17, No. 6, pp. 8-19, Jun. 1984.
Hodgkin et al., "A quantitative description of membrane current and application to conduction and excitation in nerve," J. Phys., vol. 117, No. 4, pp. 500-544, 1952.
Izhikevich, "Which model to use for cortical spiking neurons?" IEEE Trans. Neural Netw., vol. 15, No. 5, pp. 1063-1070, Sep. 2004.
Fitzhugh, "Impulses and physiological states in theoretical models of nerve membrane," Biophys. J., vol. 1, No. 6, pp. 445-466, 1961.
Brette et al., "Adaptive exponential integrate and fire model as an effective description of neuronal activity," J. Neurophys., vol. 94, No. 5, pp. 3637-3642, 2005.
Bartolozzi et al., "Synaptic dynamics in analog VLSI," Neural Comput., vol. 19, No. 10, pp. 2581-2603, 2007.
Turrigiano et al., "Homeostatic plasticity in the developing nervous system," Nature Rev. Neurosci., vol. 5, No. 2, pp. 97-107, 2004.
Song et al., "Competitive Hebbian Learning Through Spike-Timing Dependent Synaptic Plasticity," Nature Neuroscience, vol. 3, 2000, pp. 919-926.
Fuhrmann et al., "Spike frequency adaptation and neocortical rhythms," J. Neurophys., vol. 88, No. 2, pp. 761-770, 2002.
Boegerhausen et al., "Modeling short-term synaptic depression in silicon," Neural Comput., vol. 15, No. 2, pp. 331-348, 2003.
Wu et al., "Contribution of AMPA, NMDA, and GABA(A) receptors to temporal pattern of postsynaptic responses in the inferior colliculus of the rat," J. Neurosci., vol. 24, No. 19, pp. 4625-4634, 2004.
Hynna et al., "Neuronal ion-channel dynamics in silicon," in Proc. IEEE Circuits Syst. ISCAS Int. Symp., May 2006, pp. 3614-3617.
McMurchie et al., "Path Finder: A negotiation-based performance-driven router for FPGAs," in Proc. 3rd Int. ACM Symp. Field Program. Arrays, 1995, pp. 111-117.
Hines et al., "Neuron: A tool for neuroscientists," Neuroscientist, vol. 7, No. 2, pp. 123-135, 2001.
Minkovich et al., "Programming Time-Multiplexed Reconfigurable Hardware Using a Scalable Neuromorphic Compiler," IEEE Trans. on Neural Networks and Learning Systems, vol. 23, No. 6, Jun. 2012, pp. 889-910.

\* cited by examiner

NEUROMORPHIC COMPILER

CROSS-REFERENCE TO RELATED APPLICATIONS

This application claims priority from U.S. Provisional Patent Application, Ser. No. 61/642,029, filed May 3, 2012, the entire contents of which is incorporated herein by reference.

STATEMENT REGARDING FEDERALLY SPONSORED RESEARCH OR DEVELOPMENT

This invention was made with Government support under Contract No. HRL 0011-09-C-0001 awarded by DARPA. The Government has certain rights in the invention.

BACKGROUND

1. Technical Field

The invention relates to analog circuits, systems and related signal processing. In particular, the invention relates to elements and processing used in synapses of biologically inspired neuromorphic circuits and systems.

2. Description of Related Art

Complex, real-time and near real-time processing and control applications are becoming more commonplace and important. Examples include, but are not limited to, real-time image processing, as well as processing data, from a large array of sensors (e.g., a focal plane array of optical sensors) that may involve simultaneous processing of multiple, parallel channels from the sensor array. Such real-time processing often presents significant design challenges including, but not limited to, providing implementations that have sufficient processing power and at the same time exhibit reasonable energy efficiency. Neuromorphic circuits and related circuit topologies may offer a solution to some of these significant obstacles associated with the design and implementation of real-time processing and control.

Neuromorphic circuits are electronic circuits that mimic the operation of cell populations within a nervous system and as such, may offer a number of advantages for robust signal processing in support of various real-time control and sensor processing applications. In particular, neuromorphic circuits may facilitate robust signal processing in a manner that mimics certain populations of neural cells including, but not limited to, populations of neural cells found in the brain of an animal, for example. As an animal's brain is generally adept at processing and interpreting a barrage of signals received from an animal's environment in a robust and energy efficient manner, so too are various neuromorphic circuits that mimic brain-like functions. Specifically, the neuromorphic circuit may perform various brain-like functions in a manner substantially similar to, or at least modeled on, its biological counterpart. However, the challenge remains to develop practical implementations of neuromorphic circuits and more particularly, low-power integrated circuit implementations thereof, that can be applied to real-time control and processing systems.

BRIEF SUMMARY

In some embodiments, a neuromorphic compiler is provided. The neuromorphic compiler comprises a placement module to provide analytic placement of neurons in a neural network description. Analytic placement produces placed neurons. The neuromorphic compiler further comprises a smoothing module to perform diffusion-based smoothing of the placed neurons and a legalization module to adjust locations of the placed neurons to correspond to legal locations of neuromorphic neurons within a neural fabric. The neuromorphic compiler further comprises a simulated annealing module to refine locations of the placed neurons within the neural fabric using simulated annealing following location adjustment by the legalization module. According to various embodiments, the neural fabric implements a synaptic time-multiplexed neuromorphic network.

In some embodiments, a synaptic time multiplexing (STM) neuromorphic system is provided. The STM neuromorphic system comprises a neural fabric having a plurality of nodes interconnected by a plurality of switches that provide selectable synaptic pathways between the nodes. The STM neuromorphic system further comprises a neuromorphic compiler. The neuromorphic compiler comprises a placement engine to provide mapping of neurons of a neural network description into the nodes of the neural fabric, the mapping of neurons to minimize an average synaptic pathway length. The neuromorphic compiler further comprises a connection router to provide routing of connections between the mapped neurons to implement a neural network described in the neural network description as an STM neuromorphic network. The routed connections are distributed among a plurality of time slots of the STM neuromorphic network and are implemented by switch states of the switches of the neural fabric, according to various embodiments.

In some embodiments, a method neuromorphic compiling of a synaptic time-multiplexed (STM) neuromorphic network is provided. The method of neuromorphic compiling comprises providing analytic placement of neurons in a neural network description, the analytic placement to produce placed neurons. The method of neuromorphic compiling further comprises performing diffusion-based smoothing of the placed neurons and providing legalization of the placed neurons following diffusion-based smoothing. Providing legalization comprises adjusting locations of the placed neurons according to legal locations of neuromorphic neurons within a neural fabric, according to various embodiments. The method of neuromorphic compiling further comprises performing simulated annealing of the placed neurons following legalization to refine placed neuron locations within the neural fabric. According to various embodiments, the neural fabric comprises a plurality of nodes comprising neuromorphic neurons and a plurality of switches to provide selectable interconnections between the nodes to define synaptic pathways between neuromorphic neurons within an STM time slot during an STM cycle of the STM neuromorphic network.

BRIEF DESCRIPTION OF THE DRAWINGS

Various features of embodiments in accordance with the principles of the present invention described herein may be more readily understood with reference to the following detailed description taken in conjunction with the accompanying drawings, where like reference numerals designate like structural elements, and in which.

Certain embodiments have other features that are one of in addition to and in lieu of the features illustrated in the above-referenced figures. These and other features are detailed below with reference to the above-referenced figures.

DETAILED DESCRIPTION

Embodiments consistent with the principles of the present invention provide compiling of a neuromorphic network. In particular, embodiments in accordance with the principles described herein may provide a neuromorphic compiler configured to implement a neural network in a neural fabric comprising neuromorphic neurons. In some embodiments, the implemented neural network employs synaptic time multiplexing. The neuromorphic compiler maps or places neurons in a neural network description into locations of neuromorphic neurons within the neural fabric (i.e., solves a placement problem). In some embodiments, the neuromorphic compiler further provides routing between the neuromorphic neurons of the neural fabric to establish synaptic pathways defined by the neural network description (i.e., solves a routing problem). In various embodiments, the synaptic pathways, and synapses of the neural fabric associated with the synaptic pathways, are assigned to a plurality of time slots within a synaptic time multiplexing cycle. Embodiments of the present invention are highly scalable and may provide an automated, time efficient mechanism to implement arbitrarily large neural networks in a neural fabric of a synaptic time multiplexed neuromorphic network.

According to some examples of the embodiments herein, synaptic time multiplexing may be employed in conjunction with the neuromorphic compiler to implement a fully connected neural network by time multiplexing physical connections within the neuromorphic network. In particular, 'synaptic time multiplexing,' as defined and employed herein, divides or breaks down the fully connected neural network into a plurality of decoupled sub-networks. The plurality of decoupled sub-networks comprises all of the nodes of the fully connected neural network. However, each of the decoupled sub-networks comprises only a subset of a set of connections between nodes that is represented by the fully connected neural network. Synaptic time multiplexing further forms the fully connected neural network as a time series of the various decoupled sub-networks. In particular, synaptic time multiplexing forms the decoupled sub-networks in different time slots of a synaptic time multiplexing cycle. In some embodiments, each of the decoupled sub-networks is formed in the different time slots. When the synaptic time multiplexing cycle is completed, all of the decoupled sub-networks have been formed. Moreover, when combined over a period of the synaptic time multiplexing cycle, the decoupled sub-networks and their respective subsets of connections produce the fully connected neural network.

Figure 1A:
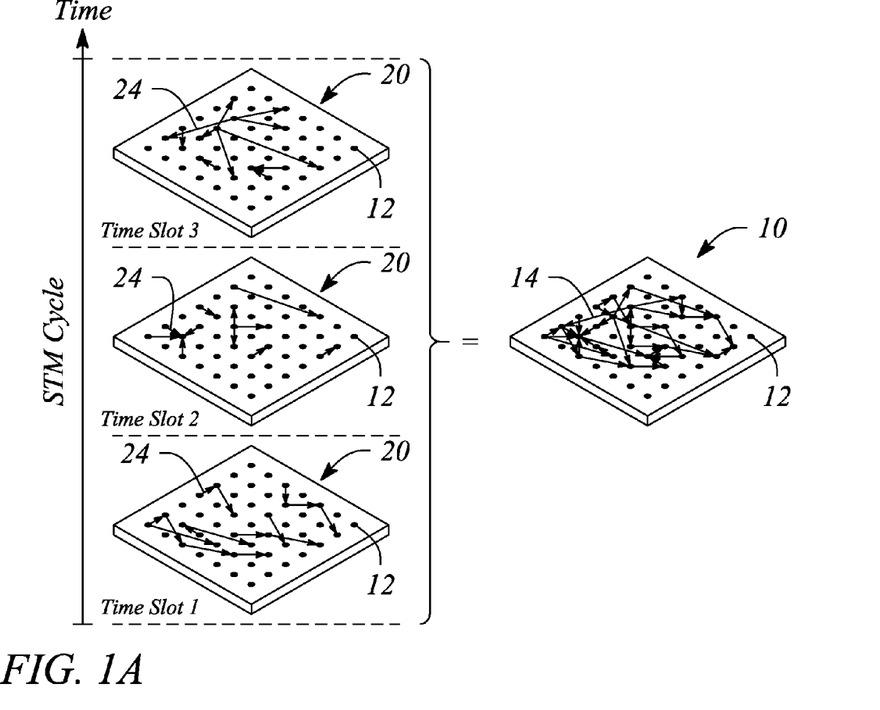
FIG. 1A illustrates a schematic representation of synaptic time multiplexing, according to an embodiment consistent with the principles of the present invention.

FIG. 1A illustrates a schematic representation of synaptic time multiplexing, according to an embodiment consistent with the principles of the present invention. In particular, a right side of FIG. 1A illustrates a fully connected neural network 10 in terms of nodes 12 and connections 14 between nodes. A left side of FIG. 1A illustrates three decoupled sub-networks 20, by way of example. A sub-network 20 comprises the nodes 12 of the fully connected neural network. Further, the sub-network 20 comprises a subset of the connections 24 in the fully connected neural network 10. For example, the respective subset of the connections 24 may be different for each sub-network 20. Combined, the connections 24 of the subsets equal the set of the connections 14 of the fully connected neural network 10 as indicated by an equal sign ('=') in FIG. 1A. Moreover, the subsets of the connections 24 illustrated in FIG. 1A may be executed or otherwise formed during separate time slots of a synaptic time multiplexing cycle (e.g., time slots 1, 2 and 3, as illustrated). When combined or summed together, the subsets of connections 24 formed during the separate time slots produce all of the connections 14 of the fully connected neural network 10. As such, once every synaptic time multiplexing cycle, the fully connected neural network 10 may be realized by the sequential formation of the subsets of connections 24 represented by the decoupled sub-networks 20.

Figure 1B:
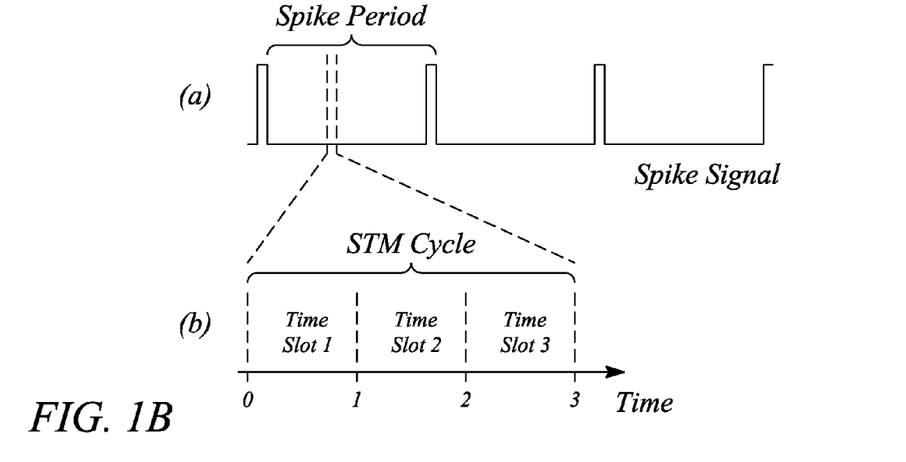
FIG. 1B illustrates a graphical representation of a synaptic time multiplexing cycle, according to an embodiment consistent with the principles of the present invention.

FIG. 1B illustrates a graphical representation of a synaptic time multiplexing cycle, according to an embodiment consistent with the principles of the present invention. Also illustrated is a plot of an example spike signal. In particular, an upper portion of FIG. 1B labeled (a) illustrates the spike signal having a spike period, and a lower portion of FIG. 1B labeled (b) illustrates a synaptic time multiplexing cycle of the spike period. The synaptic time multiplexing cycle includes three time slots, as illustrated by way of example. The three time slots may be the time slots during which the decoupled sub-networks 20 of FIG. 1A are formed, for example. During a first time slot (e.g., time slot 1) of FIG. 1B, a first decoupled sub-network 20 (or e.g., connections 24 thereof) may be formed. Then, during a second time slot (e.g., time slot 2) and a third time slot (e.g., time slot 3) of FIG. 1B, a second decoupled sub-network 20 and a third decoupled sub-network 20, respectively, (or e.g., respective connections 24 of each thereof) in FIG. 1A may be formed, for example. At an end of the synaptic time multiplexing cycle, all of the decoupled sub-networks, and by extension all of the subsets of connections 24, have been formed such that all of the connections 14 of the fully connected neural network 10 have been formed. Further, the synaptic time multiplexing cycle is a fraction of the spike period of the spike signal, as illustrated in FIG. 1B. According to various examples, the synaptic time multiplexing cycle may be repeated in each spike period and is timed to be completed during a spike of the spike signal. Further discussion of synaptic time multiplexing is provided by Minkovich et al., "Programming Time-Multiplexed Reconfigurable Hardware Using a Scalable Neuromorphic Compiler," *IEEE Trans. on Neural Networks and Learning Systems*, Vol. 23, No. 6, June 2012, pp. 889-910, incorporated herein by reference in its entirety. Synaptic time multiplexing is also described in more detail in a co-pending patent application "Synaptic Time Multiplexing," Ser. No. 13/535,114, filed Jun. 27, 2012, to Cruz-Albrecht et al., incorporated herein by reference in its entirety. According to various examples, circuits and systems that employ synaptic time multiplexing may transmit signals within and among elements of the circuits and the systems as spike signals, e.g., as illustrated in FIG. 1B.

Herein, a 'signal' is defined as a time varying quantity. Thus, a signal may be generally represented by a function of time t as S(t). However, in general herein, signals are represented without explicit reference to time for simplicity of notation and not by way of limitation. For example, the signal S(t) may be denoted or represented herein simply as 'S'. Herein, a 'spike signal', also referred to as an action potential, is defined herein as a signal that comprises two states as a function of time (t). According to some embodiments, a first state of the two states is referred to as a low or 'OFF' state and a second state of the two states is referred to as a high or 'ON' state. In various examples, the states may represent one or both of voltage and current values or levels. For example, the first state may be a first voltage (e.g., 0 millivolts (mV)) and the second state may be a second voltage (e.g., 1 mV). Alternatively, the states may be represented by values of current such that the first state is a first current (e.g., 0 microamps (μA)) and the second state is a second current (e.g., 10 μA). A spike signal in which the states are represented as voltage values may be referred as a 'voltage' spike signal. Also, a spike signal in which values of current represent the states may be referred to as a 'current' spike signal.

Further, a 'spike signal' is generally characterized by being in or exhibiting one of the two states (e.g., the first or OFF state) for a majority of the time t with only brief transitions to the other state (e.g., the second or ON state), by definition herein. For example, the spike signal may exhibit a sequence of spikes of the ON state that are separated by relatively longer periods or inter-spike intervals (i.e., relative to a length of the spike) of the OFF state. According to various examples, a ratio of a length in time of a spike or 'spike time' to a length in time of an inter-spike interval or 'inter-spike interval time' is generally much less than one. In some embodiments, the ratio may be less than about 0.2. In some embodiments, the ratio is generally less than about 0.1 and may even be less than about 0.05. For example, the OFF state inter-spike interval time may be about 10 seconds (s) while the spike time of the ON state may have a length in time of about 1 s, for example. In another example, the ON state spike time may be about 0.1 s, while the OFF state inter-spike interval time between a pair of ON state spikes may be between about 1 s and about 10 s or more.

According to various examples, the spikes of the spike signal may be either aperiodic or periodic. For example, an aperiodic spike signal may comprise a series of spikes that occur at substantially random times or have substantially random inter-spike intervals. On the other hand, the spike signal may be a periodic spike signal that exhibits spikes at regular and repeating points in time. For example, a periodic spike signal may have a spike every 10 s. In another example, spikes may occur at intervals of about 5 s in another periodic spike signal. Such periodic spike signals are often said to have or exhibit a duty cycle. Herein, 'duty cycle' is defined in the usual sense as a ratio of a length of a spike to a time interval between spikes in a periodic spike signal.

Further, a 'periodic spike signal' may be piece-wise periodic or quasi-periodic as used herein. In particular, the periodic spike signal may be periodic for only a finite and relatively short period of time. For example, a periodic spike signal may comprise a sequence of five or ten spikes in a periodic sequence. In another example, a periodic spike signal may comprise a finite sequence of periodic spikes (e.g., 5 spikes) followed by a relatively long interval of no spikes that may be further followed by another finite sequence of periodic spikes. The other finite sequence of periodic spikes may have the same number (e.g., 5) or a different number (e.g., 1, 2, 3, 4, 6, 7, 8, . . . ) of spikes, for example. In other embodiments, a duty cycle, or equivalently an inter-spike interval, of spikes of a periodic spike signal may vary as a function of time.

In some embodiments, spikes of a spike signal (either aperiodic or periodic) may occur asynchronously. By 'asynchronously' it is meant by definition herein that timing of a spike in the spike signal is not determined or otherwise tied to a particular clock signal. In particular, spikes of a pair of spike signals may be asynchronous with respect to one another. Timing of the spikes in the pair of asynchronous spike signals is or may be substantially uncorrelated between the pair. As such, spikes of a first spike signal of the pair may occur at any time relative to spikes of a second spike signal of the pair since the pair of spike signals are not tied to or otherwise regulated by a master clock signal.

Herein, 'scaling' a signal is defined as multiplying the signal by a scalar value. Scaling generally affects a magnitude of the signal, by definition herein. For example, scaling a signal S by an arbitrary value P, with P being a scalar value, is equivalent to forming a multiplicative product P·S. Scaling may be provided by a gain block, according to some examples.

An amplifier with a specified gain or gain value g is an example of a gain block that may provide signal scaling. The gain g of the amplifier is applied by the amplifier to an amplitude of an input signal $S_{in}$ at an input of the amplifier to produce an output signal $S_{out}$ where the output signal $S_{out}$ equals the multiplicative product g times $S_{in}$ (e.g., $S_{out}=g \cdot S_{in}$). In general, the amplifier gain g may be positive or negative. An amplifier having negative gain is simply an amplifier having a gain value g that is less than zero (i.e., −g where g is a positive integer), by definition herein.

Herein, 'spike timing dependent plasticity (STDP)' is defined as a characteristic that is observed in synapses in the brain generally involving an adjustment of strength of a connection or 'synapse' between a pair of neurons. The adjustment may be defined by an STDP learning rule that establishes a variation in a synaptic conductance or weight w, based on a time difference (both positive and negative) or relative timing of input and output action potentials (i.e., spikes) at the synapse. The STDP learning rule relates a change Δw in the synaptic conductance of a synapse that connects a pair of neurons to a timing difference ($\Delta t_{i,j}=t_i^{pre}-t_j^{post}$) between the output action potential of a pre-synaptic neuron ($t_i^{pre}$) and the input action potential of a post-synaptic neuron ($t_j^{post}$).

Figure 2:
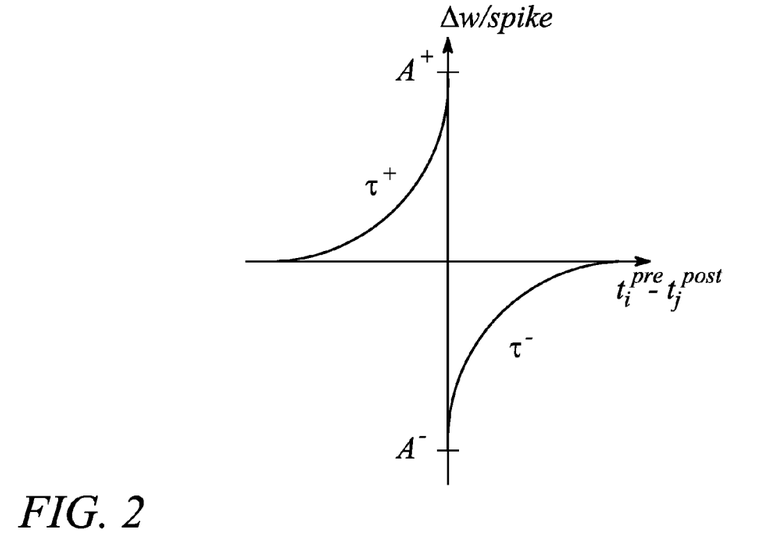
FIG. 2 illustrates a graph of a spike timing dependent plasticity (STDP) learning rule, according to an example consistent with the principles of the present invention.

FIG. 2 illustrates a graph of a spike timing dependent plasticity (STDP) learning rule, according to an example consistent with the principles described herein. As illustrated in FIG. 2, the STDP learning rule or curve has four parameters $A^+$, $A^-$, $\tau^+$ and $\tau^-$ that control a shape of the of the STDP learning curve. The first two parameters, a positive amplitude $A^+$ and a negative amplitude $A^-$, control a maximum change in the synaptic conductance Δw associated respectively with potentiation and depression of the synapse response. Time decay constants $\tau^+$ and $\tau^-$ of the STDP learning curve set a decay rate for potentiation and depression, respectively. A further discussion of the STDP learning rule may be found, for example, in Song et al., "Competitive Hebbian Learning Through Spike-Timing Dependent Synaptic Plasticity," *Nature Neuroscience*, Vol. 3, 2000, pp. 919-926, incorporated herein by reference in its entirety.

In particular, as defined by the STDP learning rule illustrated in FIG. 2, the synaptic conductance w undergoes depression according to an exponential decay of the STDP learning rule when the timing difference $\Delta t_{i,j}$ is positive (e.g., see right half of Figure). Alternatively, in response to a negative timing difference $\Delta t_{i,j}$, the synaptic conductance w undergoes potentiation according to an exponential decay of the left half of the STDP learning rule (e.g., see left half of FIG. 2). The change or adjustment of the synaptic conductance w provided by the STDP learning rule may substantially mimic observed changes in the synaptic conductance w associated with synapses between neurons in the brain, according to some embodiments.

According to various examples, the 'neuromorphic neuron', by definition herein, is a neuromorphic construct that mimics or emulates the neuro-biological characteristics of a biological neuron. In various examples, the neuron may comprise any of a number of neuromorphic constructs including, but not limited to, a complimentary metal oxide semiconductor (CMOS) neuron circuit and a memristor-based neuron circuit. In other embodiments, the neuron may be a software-based neuron or a firmware-based neuron that, in whole or in part, employs a software or firmware simulation of the neuro-biological characteristics of the biological neuron. For example, the neuron may be implemented based on a leaky integrate and fire neuron model that comprises a leaky integrator and is compatible with spike signals. Any of a variety of other neuron implementations including, but not limited to, a Hodgkin-Huxley neuron, Izhikevich neuron, and a current or conductance integrate-and-fire (e.g., an adaptive exponential integrate and fire model) neuron may be employed as the neuron herein, according to various examples. Further example neuron implementations may be found, for example, in FIG. 2 of E. M. Izhikevich, "Which Model to Use for Cortical Spiking Neurons?," *IEEE Transactions on Neural Networks*, 15:1063-1070, 2004, incorporated by reference herein in its entirety.

According to various embodiments, the 'synapse', by definition herein, comprises a neuromorphic construct that mimics or emulates the neuro-biological characteristics of a biological synapse. In some embodiments, the synapse may comprise any of a number of neuromorphic constructs including, but not limited to, synapses based on CMOS circuitry. For example, the synapse may comprise CMOS circuitry and a learning module. The learning module may implement any of several different types of synaptic plasticity rules including, but not limited to, Hebbian plasticity, spike timing-dependent plasticity and short-term plasticity. In other embodiments, the synapse may be a software-based synapse or a firmware-based synapse that, in whole or in part, employs a software simulation or a firmware simulation, respectively, of the neuro-biological characteristics of the biological synapse (e.g., to implement one or both of synapse circuitry and the learning module). In a basic form, the synapse provides an interface between neurons. For example, the interface may merely translate signals from a received form to a form that is compatible with the neuron.

For example, the learning module of the synapse may be implemented as one or more of hardware, software and firmware, which implements a synaptic spike timing dependent plasticity (STDP) learning rule. Such a synapse may be referred to as an STDP synapse. In some embodiments, the STDP synapse comprises a synapse core. The synapse core is configured to receive a pre-synaptic spike signal and to produce a weighted spike signal. In some embodiments, a pre-synaptic spike signal received by the synapse core is the pre-synaptic signal $V_{pre}$ provided by a pre-synaptic neuron (e.g., a neuron of a node 12). According to various examples, the weighted spike signal that is produced by the synapse core is weighted in accordance with a weight signal W(t) that is based on the STDP learning rule.

Embodiments consistent with the principles described herein may be implemented using a variety of devices including, but not limited to, integrated circuits (ICs), very large scale integrated (VLSI) circuits, application specific integrated circuits (ASIC), software, firmware or a combination of two or more of the above. For example, elements or 'blocks' of an apparatus consistent with the principles described herein may all be implemented as circuit elements within an ASIC or a VLSI circuit. In another example, the entire apparatus may be implemented as software using a computer programming language (e.g., C/C++) or software-based modeling environment (e.g., Matlab). In yet another example, some of the blocks may be implemented using actual circuitry (e.g., as an IC or an ASIC) while other blocks may be implemented in software or firmware.

Further, as used herein, the article 'a' is intended to have its ordinary meaning in the patent arts, namely 'one or more'. For example, 'a synapse' means one or more synapses and as such, 'the synapse' means 'the synapse(s)' herein. Also, any reference herein to 'top', 'bottom', 'upper', 'lower', 'up', 'down', 'front', 'back', 'left' or 'right' is not intended to be a limitation herein. Herein, the term 'about' when applied to a value generally means within the tolerance range of the equipment used to produce the value, or in some examples, means plus or minus 20%, or plus or minus 10%, or plus or minus 5%, or plus or minus 1%, unless otherwise expressly specified. Moreover, examples and embodiments herein are intended to be illustrative only and are presented for discussion purposes and not by way of limitation.

Figure 3:
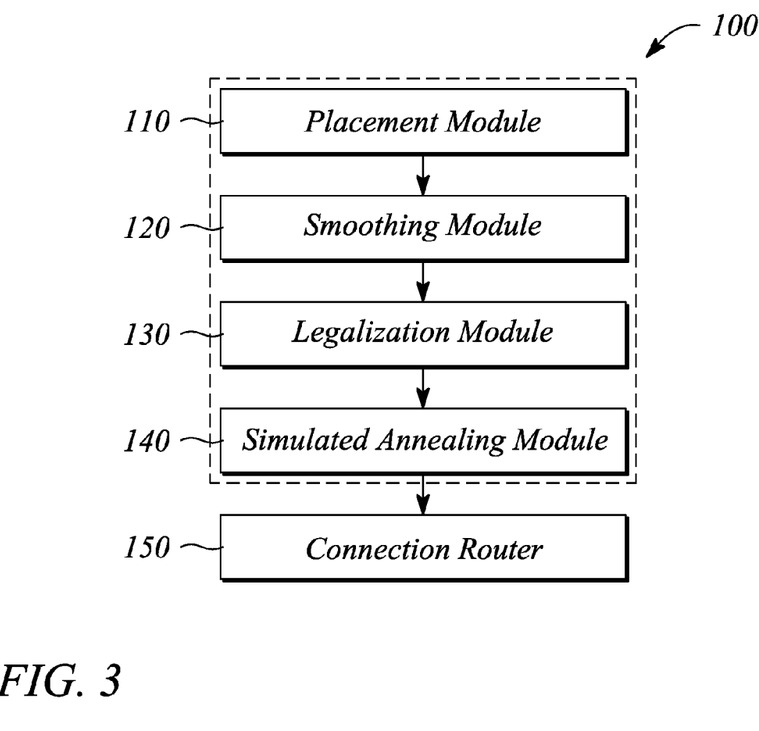
FIG. 3 illustrates a block diagram of a neuromorphic compiler, according to an embodiment consistent with the principles of the present invention.

FIG. 3 illustrates a block diagram of a neuromorphic compiler 100, according to an embodiment consistent with the principles of the present invention. The neuromorphic compiler 100 is configured to map a neural network description (e.g., a neural netlist) into elements of a physical neural network circuit. According to various embodiments, the physical neural network circuit comprises a neural fabric. In particular, the neural fabric may comprise a plurality of nodes interconnected by a plurality of switches. The neural fabric may be configured to implement a synaptic time-multiplexed (STM) neuromorphic network, according to some embodiments. In some embodiments, the neural fabric is substantially similar to the neural fabric described in U.S. patent application Ser. No. 13/535,114 to Cruz-Albrecht et al., incorporated by reference in its entirety herein.

As illustrated, the neuromorphic compiler 100 comprises a placement module 110. The placement module 110 is configured to provide analytic placement of neurons defined in the neural network description. Analytic placement results in or produces placed neurons by establishing an initial placement of the neurons, according to various embodiments. In particular, the analytic placement may provide an initial placement of the neurons in bounded space such as, but not limited to, a two-dimensional (2-D) substantially rectangular region. For example, the bounded space may represent the neural fabric of the physical neural network circuit.

In some examples, the 2-D substantially rectangular region may be subdivided by a rectangular grid based on an arbitrary Cartesian coordinate system. Analytic placement may produce the placed neurons by assigning the neurons to particular coordinates (e.g., x and y coordinates) corresponding to the rectangular grid. As such, each neuron $n_i$ may be assigned a location in the rectangular grid denoted by the particular coordinates $(x_i, y_i)$, for example. Neurons that function as input/output neurons may be located along (e.g., have coordinates corresponding to) an edge of the rectangular grid or other bounded space representing the neural fabric, while other non-I/O neurons may be located generally away from the edge, according to various examples.

According to some embodiments, the initial placement of the neurons is provided by converting a general problem of placing the neurons (i.e., the placement problem) into a quadratic programming problem where synaptic pathways are interpreted as 'springs' and neurons are viewed as connection points connected by the springs. For example, a quadratic function of the length of the springs connecting between the connection points may be constructed to represent a total potential energy E in the springs (i.e. spring force). The quadratic programming problem seeks to minimize the total potential energy E.

According to some examples, the quadratic function may be given by equation (1) as $$E = \Sigma w_k \cdot ((x_i - x_j)^2 + (y_i - y_j)^2) \quad (1)$$

where a k-th synaptic pathway connecting a first neuron $n_i$ to a second neuron $n_j$ is represented by a spring force $w_k$, the first neuron $n_i$ has a location given by $(x_i, y_i)$ and the second neuron $n_j$ has a location given by $(x_j, y_j)$ within the grid, and where the summation $\Sigma$ is performed over all m pairs of neurons in the neural network description that are connected by synaptic pathways (i.e., k=1 ... m). Equation (1) is generally applicable to pair-wise connections between neurons (i.e., synaptic pathways having a fan-out of one). The quadratic function of equation (1) may be solved using preconditioned Conjugate Gradient method, according to various embodiments. For example, the preconditioned Conjugate Gradient method may be as described by J. Dongarra et al., "A Sparse Matrix Library in C++ for High Performance Architectures," *Proceedings of the Second Object Oriented Numerics Conference*, pp. 214-218, 1994, incorporated herein by reference in its entirety.

However, in some embodiments, a synaptic pathway defined by the neural network description may have a fan-out that is greater than one (e.g., the synaptic pathway connects between more than two neurons). In particular, a presynaptic neuron may connect to a plurality of post-synaptic neurons by the synaptic pathway, in some examples. Such synaptic pathways represent a one-to-many connection (as opposed to a pair-wise or one-to-one connection) and may not be properly represented by the pair-wise connection-based total potential energy E of equation (1). In these embodiments, synaptic pathways representing a one-to-many connection may be converted or transformed into a plurality of synaptic pathways providing pair-wise or one-to-one connections between neurons. In some embodiments, the transformation may be accomplished using either a star model or a clique model, for example.

Figure 4:
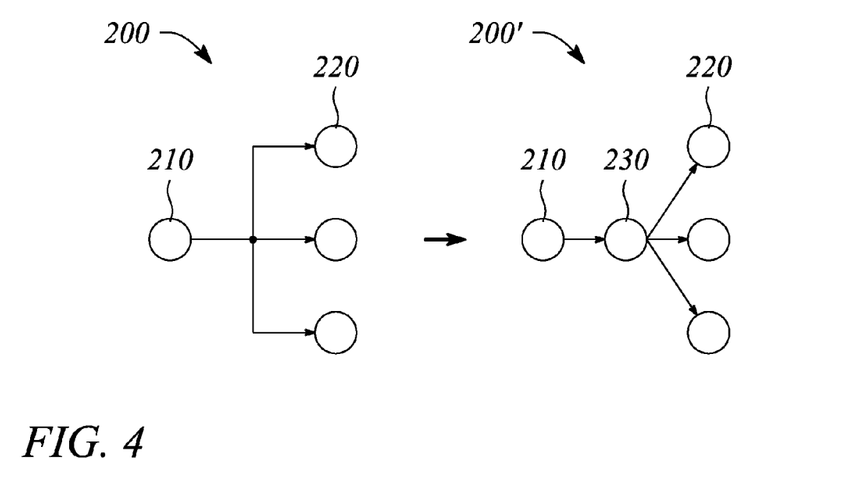
FIG. 4 illustrates a block diagram depicting a transformation of a one-to-many synaptic pathway into a plurality of pair-wise synaptic pathways using a star model, according to an embodiment consistent with the principles of the present invention.

FIG. 4 illustrates a block diagram depicting a transformation of a one-to-many synaptic pathway 200 into a plurality of pair-wise synaptic pathways 200' using a star model, according to an embodiment of the present invention. In particular, illustrated at the left side of FIG. 4 is an example one-to-many synaptic pathway 200 that provides a connection from a presynaptic neuron 210 to a plurality of post-synaptic neurons 220. The example one-to-many synaptic pathway 200 on the left side of FIG. 4 has a fan-out of three, as illustrated.

Illustrated on a right side of FIG. 4 is the one-to-many synaptic pathway after being transformed into a plurality of pair-wise connection synaptic pathways 200' using a star model. In particular, a fictitious neuron 230 has been inserted at a junction of the one-to-many synaptic pathway 200. Insertion of the fictitious neuron 230 produces the plurality of pair-wise connection synaptic pathways 200', as illustrated in FIG. 4. In particular, the one-to-many synaptic pathway 200 has been transformed into four pair-wise connection synaptic pathways 200', namely: a pathway pair-wise connection synaptic pathway 200' from the pre-synaptic neuron 210 to the fictitious neuron 230 and three separate a pathway pair-wise connection synaptic pathways 200' from the fictitious neuron 230 to each of the post synaptic neurons 220 of the plurality. In general, the star model-based transformation illustrated in FIG. 4 may be used to convert substantially any set of synaptic pathways defined by the neural network description into a set of pair-wise connection synaptic pathways compatible with the quadratic function of equation (1), for example.

Figure 5:
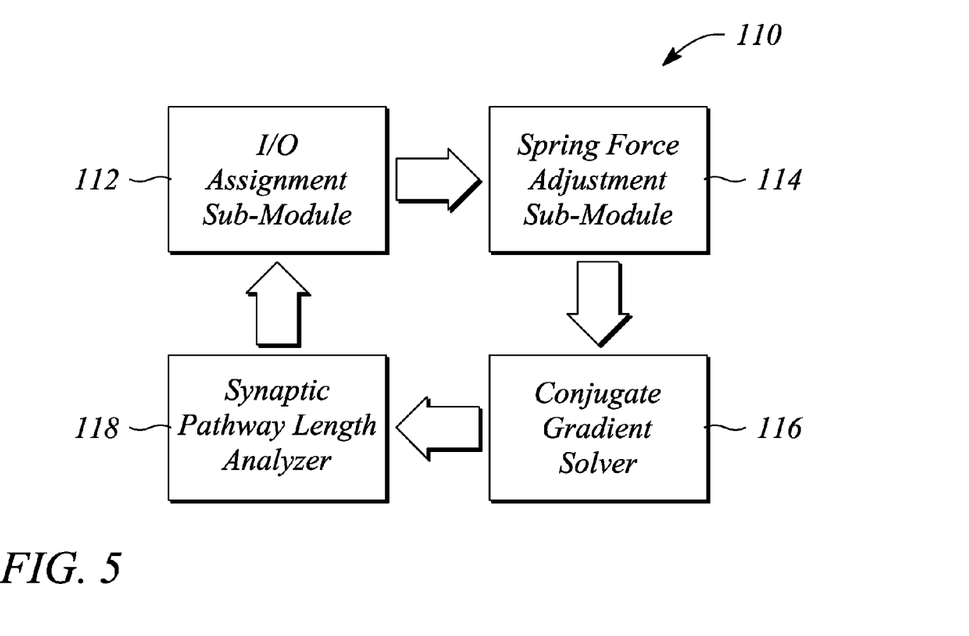
FIG. 5 illustrates a block diagram of a placement module, according to an embodiment consistent with the principles of the present invention.

FIG. 5 illustrates a block diagram of the placement module 110, according to an embodiment consistent with the principles of the present invention. In particular, as illustrated, the placement module 110 may comprise an input/output (I/O) assignment sub-module 112. The I/O assignment sub-module 112 is configured to assign I/O neurons (i.e., neurons that provide connectivity outside of the neural network) to locations along the edge or edges of the bounded space representing the neural fabric. The placement module 110 may further comprise a spring force adjustment sub-module 114. The spring force adjustment sub-module 114 is configured to provide spring force adjustment (e.g., adjustment of spring force $w_k$ in equation (1) above). The placement module 110 may further comprise a conjugate gradient solver 116. The conjugate gradient solver 116 is configured to apply the preconditioned Conjugate Gradient method to solve a quadratic function such as that provided by equation (1).

The placement module 110 may further comprise a synaptic pathway length analyzer 118. The synaptic pathway length analyzer 118 is configured to determine a total synaptic pathway length according to synaptic pathways defined in the neural network description. The total synaptic pathway length may employ a Manhattan distance, for example. According various examples, the placement module 110 may iteratively employ each of the I/O assignment sub-module 112, the spring force adjustment sub-module 114, the conjugate gradient solver 116 and the synaptic pathway length analyzer 118 to provide analytic placement and produce the placed neurons. As illustrated, interconnecting arrows depict the iterative employment of the I/O assignment sub-module 112, the spring force adjustment sub-module 114, the conjugate gradient solver 116 and the synaptic pathway length analyzer 118 in the form of a loop.

Referring again to FIG. 3, the neuromorphic compiler 100 further comprises a smoothing module 120. The smoothing module 120 is configured to perform diffusion-based smoothing of the placed neurons. In particular, diffusion-based smoothing is performed to attempt to spread out the placed neurons produced during analytic placement by the placement module 110. In some embodiments, diffusion-based smoothing performed by the smoothing module 120 is configured to spread out the placed neurons according to a local density gradient associated with the placed neurons. For example, diffusion-based smoothing may seek to reduce the local density gradient through the placed neurons by causing the placed neurons to migrate from an initial location(s) to a new location(s) that reduces the local density gradient. In some examples, the migration of the placed neurons may be represented by a velocity function that provides an estimate of a velocity of a neuron at a given function of time.

The neuromorphic compiler 100 illustrated in FIG. 3 further comprises a legalization module 130. The legalization module 130 is configured to adjust locations of the placed neurons to correspond to legal locations of neuromorphic neurons within the neural fabric. In particular, the legalization module 130 performs legalization of the placed neurons by moving the placed neurons to locations that correspond to actual (i.e., 'legal') locations of neuromorphic neurons in the neural fabric. The legalization module 130 may provide legalization of the placed neurons following diffusion-based smoothing by the smoothing module 120.

In some examples, legalization provided by the legalization module 130 may be expressed as a so-called 'online bipartite matching' problem. Neurons (e.g., the placed neurons received by the legalization module 130) may be sorted according to a number of outgoing synapses to find a best location for each of the neurons. The best location may be defined as the location that minimizes a bounding box around the neuron connected to axon terminals (e.g., post-synaptic neurons connected by the synaptic pathways to the neuron).

In some embodiments, a quad-tree structure may be employed to provide the bounding box minimization, and the legalization module 130 may implement an iterative, quad-tree structured legalization or simply 'quad-tree legalization'. In particular, in quad-tree legalization, for every level of a quad-tree, four evaluations may be made to determine a best quadrant using an estimated quadrant location. The estimated quadrant locations are updated recursively to represent a center of mass of free (i.e., unfilled) locations inside each quadrant. When a neuron is allocated to a location, the estimated locations of all of the corresponding quadrants are updated.

Further, as illustrated in FIG. 3, the neuromorphic compiler 100 may comprise a simulated annealing module 140. The simulated annealing module 140 is configured to refine locations of the located neurons within the neural fabric using simulated annealing following location adjustment by the legalization module 130. In particular, the simulated annealing module 140 employs simulated annealing in an attempt to move a selected placed neuron to a new location corresponding to a neuromorphic neuron in the neural fabric such that a length of the connections defined by the neuron connections (i.e., synaptic pathway lengths) is minimized. Since the new location is generally occupied, the movement creates a chain of moves of other neurons within the neural fabric. Once the chain of moves intersect itself, a series of moves may be generated that are substantially guaranteed to minimize the connection length as long as the neurons being moved are only connected to each other through the chain of moves. A Manhattan length or distance may be used as a metric for connection length during simulated annealing, according to various embodiments.

In some embodiments, one or more of the placement module 110, the smoothing module 120, the legalization module 130 and the simulated annealing module 140 may comprise instructions stored in a non-transitory, computer readable medium. For example, the instructions may be instructions of a computer program stored in a computer memory. Herein, computer memory is defined explicitly as non-transitory computer memory. The computer program when accessed by a computer and executed may implement the neuromorphic compiler 100, for example. In some examples, the computer memory may comprise primary memory of a general-purpose computer such as, but not limited to, random access memory (RAM), e.g., static RAM (SRAM), dynamic RAM (DRAM), etc. In other examples, the computer memory may comprise media of a disk drive such as, but not limited to, a hard disk and an optical disc (e.g., CD drive, DVD drive, etc.). In yet other examples, the computer memory may comprise various types of flash memory (e.g., a thumb drive). In other examples, the computer memory may comprise network storage (e.g., 'the cloud').

In other embodiments, one or more of the placement module 110, the smoothing module 120, the legalization module 130 and the simulated annealing module 140 may employ a hardware implementation comprising electronic circuitry. The neuromorphic compiler 100 may be implemented as a portion of the circuitry in the physical neural network circuit comprising the neural fabric, for example. In some examples, one or more of the placement module 110, the smoothing module 120, the legalization module 130 and the simulated annealing module 140 may be implemented using a field programmable gate array (FPGA) or an application specific integrated circuit (ASIC).

In some embodiments, the neural fabric may comprise a plurality of nodes interconnected by a plurality of switches. The switches may provide selectable synaptic pathways between the nodes within the neural fabric, according to various examples. In some embodiments, a node of the neural fabric comprises a neuromorphic neuron. The neuromorphic neuron may have an output connected to an output of the node, for example. The node may further comprise a synapse connected between an input of the node and an input of the neuromorphic neuron. The synapse is configured to provide an input signal to the neuromorphic neuron during the STM cycle. In some examples, the synapse is configured to implement spike timing dependent plasticity (STDP). In some embodiments, the synapse may be substantially similar to a neuromorphic synapse with STDP described in U.S. patent application Ser. No. 13/415,812 to Cruz-Albrecht et al., incorporated by reference in its entirety herein.

Together, the placement module 110, the smoothing module 120, the legalization module 130 and the simulated annealing module 140 solve the so-called placement problem, indicated by a dashed box in FIG. 3. In some embodiments, the neuromorphic compiler 100 illustrated in FIG. 3 further comprises a connection router 150. The connection router 150 is configured to solve a so-called 'routing problem' to provide interconnections between the neuromorphic neurons of the neural fabric according to the neural network description, for example.

In particular, the connection router 150 is configured to route connections between the placed neurons within the neural fabric. The connection router 150 is to route connections following simulated annealing by the simulated annealing module 140, according to various examples (e.g., as illustrated in FIG. 3). In some embodiments, the connection router 150 may be configured to route connections between selected nodes within the neural fabric, according to various connections defined in the neural network description. Specifically, the selected nodes may be pairs of nodes corresponding to pairs of neurons connected to one another according to the neural network description. The nodes correspond to the placed neurons and the routed connections represent connections defined by switch states of the switches of the neural fabric during an STM time slot of an STM cycle.

In some embodiments, the connection router 150 is configured to attempt to route connections between pairs of nodes within the neural fabric. During the attempt to route, a successfully routed connection defines a synaptic pathway between a pair of nodes in a first time slot of the STM cycle. The connection router 150 is further configured to repeat an attempt to route connections for each node pair in which attempting to route connections failed to produce a defined synaptic pathway between nodes of the pair. A successfully routed connection produced by repeating an attempt to route connections defines a synaptic pathway between the nodes of the pair in a second STM time slot of the STM cycle. According to various examples, the connection router 150 may be configured to continue to repeat attempts to route connections until all node pairs defined in the neural network description are successfully connected. Successfully routed connections produced by subsequent attempts to route may be assigned to other STM time slots (e.g., a third time slot, a fourth time slot, etc.), for example.

In some embodiments, the connection router 150 employs a routing algorithm such as, but not limited to, an A* search algorithm. The A* search algorithm comprises using a best-first search to find a least-cost path between nodes. In some examples, the connection router 150 is configured to implement a method of scalable routing described in U.S. patent application Ser. No. 13/535,114 to Cruz-Albrecht et al., cited supra. In particular, in some embodiments the connection router 150 is configured to implement scalable routing represented as pseudocode given by:

```
S ← {(n₁,n₂) | pairs of pre- and post-synaptic neurons}
While S ≠ ∅         // minimum number of time slots based on fan-in
                    and fan-out of neuron implementation
    minTimeslot ← max( max( count(s == (*,nᵢ))/fan-in where s ∈ S
        and i = [1,# of neurons] ), max( count(s == (nⱼ, *))/fan-out
        where s ∈ S and j = [1,#of neurons] ) )
    S ← sort S by ascending order of Manhattan distance between
        pre- and post-synaptic neurons
    ST ← {STᵢ | pairs of pre- and post-synaptic neurons assigned to
        timeslot i, STᵢ ⊂ S, i =[1, minTimeslot] }
    F ← ∅
    Foreach STᵢ ∈ ST
        STᵢ ← sort STᵢ by ascending order of Manhattan distance
        Foreach sⱼ ∈ STᵢ      // sⱼ = {synapses from common pre-
            synaptic neuron j}
            find shortest paths with available lanes for sⱼ using A*
            if found
                assign available lanes to sⱼ
            else
                F ← F ∪ sⱼ
        End Foreach
    End Foreach
    S ← F
Endwhile
``` where S and F are sets of paths s, ST is a set of paths in timeslots, $ST_k$ is a set of paths assigned to a k-th timeslot, 'lanes' may comprise signal routing channels, and ∅ represents a null set.

Figure 6:
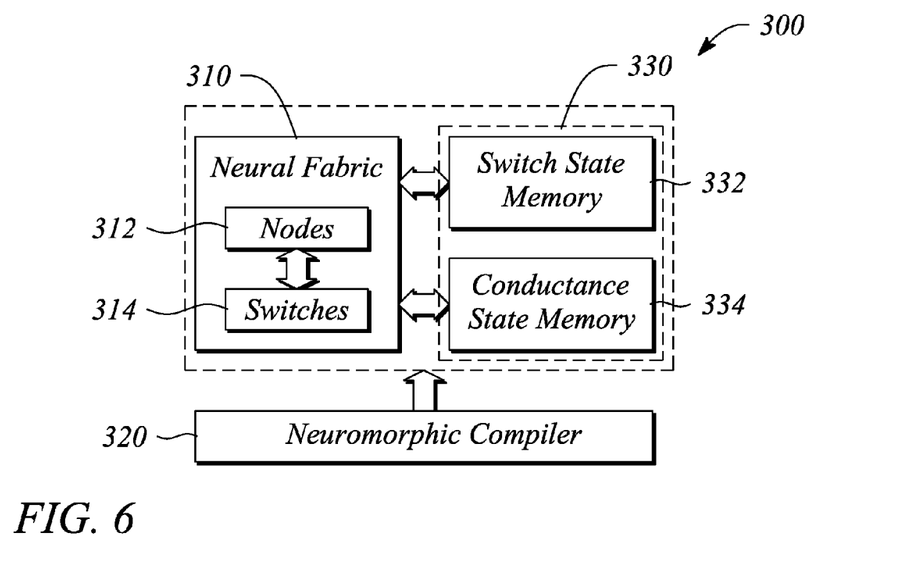
FIG. 6 illustrates a block diagram of a synaptic time multiplexed (STM) neuromorphic system, according to an embodiment consistent with the principles of the present invention.

FIG. 6 illustrates a block diagram of a synaptic time multiplexed (STM) neuromorphic system 300, according to an embodiment consistent with the principles of the present invention. As illustrated, the STM neuromorphic system 300 comprises a neural fabric 310. The neural fabric 310 has a plurality of nodes 312 interconnected by a plurality of switches 314. Selectable pathways between the nodes 312 may be formed by switch states of the switches 314. In some embodiments, the neural fabric 310 may be substantially similar to the neural fabric of the physical neural network circuit described above with respect to the neuromorphic compiler 100.

In particular, in some embodiments, a node 312 of the plurality of nodes 312 of the neural fabric 310 may comprise a neuromorphic neuron and a synapse. In some examples, an output of the neuromorphic neuron is connected to an output of the node. Further, the synapse may be connected between an input of the node 312 and an input of the neuromorphic neuron. The synapse may be configured to provide an input signal to the neuromorphic neuron, for example. In some embodiments, the synapse is configured to implement spike timing dependent plasticity (STDP). In these embodiments, the synapse may have an input connected to the input of the node 312 and another input connected to an output of the neuromorphic neuron. The connection of the other input of the synapse to the output of the neuromorphic neuron is in addition to the connection of the synapse input to an input of the node 312, for example.

As illustrated in FIG. 6, the STM neuromorphic system 300 further comprises a neuromorphic compiler 320. In some embodiments, the neuromorphic compiler 320 may be substantially similar to the neuromorphic compiler 100, described above. In particular, according to some embodiments, the neuromorphic compiler 320 comprises a placement engine to provide mapping of neurons of a neural network description into the nodes 312 of the neural fabric 310. In some examples, the mapping provided by the placement engine is configured to minimize an average synaptic pathway length.

In some embodiments, the placement engine may be configured to provide analytic placement of the neurons, to perform diffusion-based smoothing of the analytically placed neurons, to provide legalization of the placed neurons after diffusion-based smoothing, and to perform simulated annealing of the legalized, placed neurons within the neural fabric. In particular, the analytic placement, diffusion-based smoothing, legalization and simulated annealing provided by the placement engine may be substantially similar to analytic placement, diffusion-based smoothing, legalization and simulated annealing provided respectively by the placement module 110, smoothing module 120, legalization module 130 and the simulated annealing module 140 of the neuromorphic compiler 100, described above.

According to some embodiments, the neuromorphic compiler 320 further comprises a connection router. The connection router is configured to provide routing of connections between the mapped neurons. In particular, the connections routed by the connection router are to implement a neural network described in the neural network description as an STM neuromorphic network. Further, the routed connections produced by the connection router are distributed among a plurality of time slot of the STM neuromorphic network. The routed connections are implemented by switch states of the switches 314 of the neural fabric, according to various embodiments. In some embodiments, the connection router of the neuromorphic compiler 320 may be substantially similar to the connection router 150 of the neuromorphic compiler 100, described above.

In some embodiments (e.g., as illustrated in FIG. 6), the neuromorphic system 300 further comprises a memory 330. The memory 330 is configured to store the switch states of the switches 314 associated with the STM time slot of an STM cycle of the STM neuromorphic network, according to various embodiments. In some embodiments, the memory 330 comprises a digital memory or switch state memory 332 configured to store the switch states in a digital format. In some embodiments, the switch states may be stored using compression to reduce an amount of memory required to store the switch states. For example, the switch states may be compressed using any of a variety of compression methods including, but not limited to, Huffman coding and Lempel-Ziv-Welch (LZW) compression. In some embodiments, the memory 330 may also be configured to store analog values including, but not limited to, synaptic conductances of the synapses of the nodes 312 in the neural fabric 310. As such, the memory 330 may further comprise an analog memory or conductance state memory 334, according to some embodiments.

Figure 7:
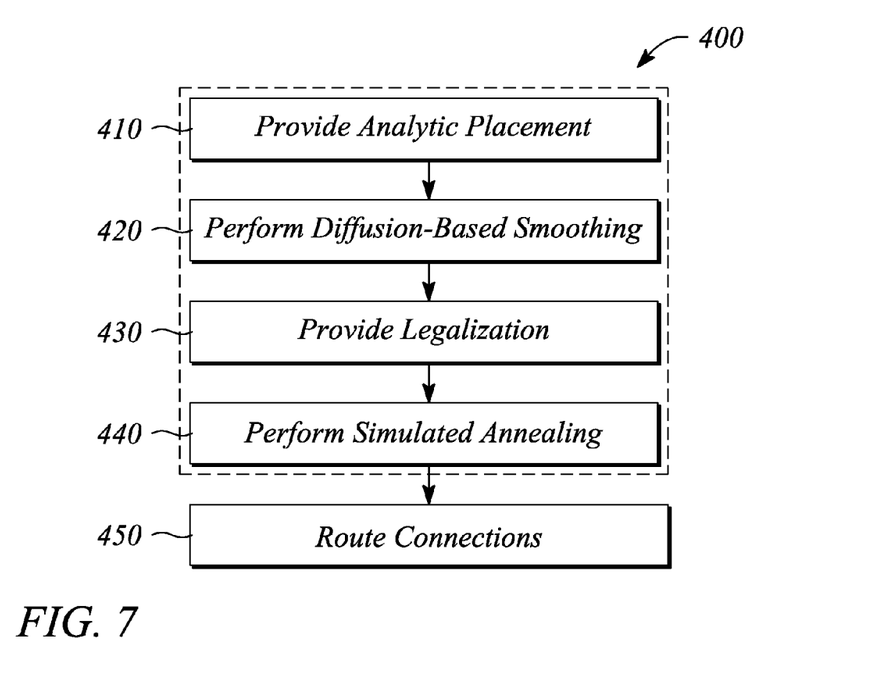
FIG. 7 illustrates a flow chart of a method of neuromorphic compiling, according to an embodiment consistent with the present invention.

FIG. 7 illustrates a flow chart of a method 400 of neuromorphic compiling, according to an embodiment consistent with the principles of the present invention. In particular, the method 400 of neuromorphic compiling is configured to provide compiling of a synaptic time-multiplexed (STM) neuromorphic network in a neural fabric. According to some embodiments, the neural fabric may be substantially similar to the neural fabric described above with respect to the neuromorphic compiler 100. In particular, the neural fabric may comprise a plurality of nodes and a plurality of switches. According to various embodiments, the plurality of switches is configured to provide selectable interconnections between the nodes. The selectable interconnections define synaptic pathways between neuromorphic neurons within an STM time slot during an STM cycle of the STM neuromorphic network, according to some embodiments. In various embodiments, a node of the plurality of nodes may comprise a neuromorphic neuron and in some examples, a synapse. In some examples, the synapse may implement spike timing dependent plasticity (STDP).

As illustrated, the method 400 of neuromorphic compiling comprises providing 410 analytic placement of neurons in a neural network description. According to various embodiments, analytic placement is configured to produce placed neurons. In some embodiments, analytic placement is substantially similar to the analytic placement provided by the placement module 110 described above with respect to the neuromorphic compiler 100.

In particular, a synaptic pathway between neuromorphic neurons of a pair of nodes may be interpreted as a spring having a spring force proportional to a distance between the nodes. The distance may be a Manhattan distance, for example. In these embodiments, providing 410 analytic placement may comprise iteratively performing in sequence an input/output (I/O) assignment, a spring force adjustment, a conjugate gradient placement solution, and a synaptic pathway length analysis. I/O assignment, spring force adjustment, the conjugate gradient placement solution and the synaptic pathway length analysis may be substantially similar to the similarly identified operations provided respectively by the I/O assignment sub-module 112, the spring force adjustment sub-module 114, the conjugate gradient solver 116 and the synaptic pathway length analyzer 118, described above with respect to the placement module 110 of the neuromorphic compiler 100, according to some embodiments.

In some embodiments, a synaptic pathway defined in the neural network description may include more than two neurons. In these embodiments (not illustrated), the method 400 of neuromorphic compiling may further comprise transforming the synaptic pathway using a star model into a plurality of pair-wise connection synaptic pathways by inserting a fictitious neuron.

In some embodiments, performing the I/O assignment during an iteration may comprise determining a center of mass of all neurons and further determining a center of mass of an I/O neuron pair comprising an I/O neuron and a neuron that is connected to the I/O neuron. Performing the I/O assignment may further comprise finding a vector pointing from the center of mass of all neurons to the center of mass of the I/O neuron pair. An extension of the vector may point to a new location of the I/O neuron. The new location may be on an edge of a region containing the neurons such as an I/O edge of the neural fabric, for example. Further, performing the I/O assignment during an iteration may comprise moving the I/O neuron to the new location. In some embodiments, the I/O neurons may be initially spaced evenly along the I/O edge of the neural fabric prior to a first iteration.

Further, in some embodiments, performing the conjugate gradient placement solution during an iteration may comprise using a conjugate gradient method to solve an equation representing a summation of a quadratic distance between neurons of a k-th pair of neurons multiplied by a k-th spring force $w_k$, the summation being over all of the pairs of neurons in a star model-transformed neural network description. In some examples, the equation representing the summation may be equation (1), given above.

In some embodiments, during various iterations, the k-th spring force $w_k$ may be scaled up by a scale factor $\alpha$ for a synaptic pathway length that is longer than an average synaptic pathway length of all of the synaptic pathways. Further, in some embodiments, during various iterations, the k-th spring force $w_k$ may be scaled down by a scale factor $\beta$ for a synaptic pathway length that is shorter than the average synaptic pathway length. The scale factor $\alpha$ may be a positive value greater than one and the scale factor $\beta$ may be a positive value less than one, for example. The synaptic pathway lengths and the average synaptic pathway length may be determined by performing the synaptic pathway length analysis, according to various embodiments.

The method 400 of neuromorphic compiling illustrated in FIG. 7 further comprises performing 420 diffusion-based smoothing of the placed neurons. Diffusion-based smoothing may be substantially similar to the diffusion-based smoothing described above with respect to the smoothing module 120 of the neuromorphic compiler 100, for example.

The method 400 of neuromorphic compiling further comprises providing 430 legalization of the placed neurons following diffusion-based smoothing. According to various embodiments, providing 430 legalization comprises adjusting locations of the placed neurons according to legal locations of neuromorphic neurons within the neural fabric. In some embodiments, legalization may be substantially similar to legalization provided by the legalization module 130, described above with respect to the neuromorphic compiler 100.

The method 400 of neuromorphic compiling further comprises performing 440 simulated annealing of the placed neurons following legalization to refine placed neuron locations within the neural fabric. According to various embodiments, simulated annealing is substantially similar to simulated annealing provided by the simulated annealing module 140 of the neuromorphic compiler 100, described above.

In some embodiments (e.g., as illustrated in FIG. 7), the method 400 of neuromorphic compiling may further comprise routing 450 connections between the legalized, located neurons within the neural fabric following simulated annealing. In various embodiments, the routed 450 connections are between selected nodes within the neural fabric according to connections defined in the neural network description. Further, the nodes may comprise the legally located neurons and the routed connections may represent connections defined by switch states of switches in the neural fabric during the STM time slot.

In some embodiments, routing 450 connections may be substantially similar to the connection routing provided by the connection router 150, described with respect to the neuromorphic compiler 100 above. In particular, in some embodiments, routing 450 connections may comprise attempting to route the connections between the mapped neurons and assigning successfully routed connections to a first STM time slot of the STM neuromorphic network. Further routing 450 connections may further comprise repeating the attempt to route connections for any connection in which the attempt to route connections failed and assigning successfully routed connections produced by the repeated attempt to route to a second STM time slot.

In some embodiments, the switch states of switches in the neural fabric may be stored in a memory and recalled from the memory to set the switches during the STM time slot. In some embodiments, the switch states are stored using compression to reduce an amount of memory employed to store the switch states. Any of a variety of compression methods including, but not limited to, Huffman coding and Lempel-Ziv-Welch (LZW) compression may be employed, for example.

Thus, there have been described examples of a neuromorphic compiler, a synaptic time multiplexing neuromorphic system and a method of neuromorphic compiling of a synaptic time multiplexing neuromorphic network. It should be understood that the above-described embodiments and examples are merely illustrative of some of the many specific embodiments and examples that represent the principles consistent with the present invention. Clearly, those skilled in the art can readily devise numerous other arrangements without departing from the scope consistent with the principles described herein as defined by the following claims.

What is claimed is:

1. A neuromorphic compiler comprising:
   a placement module to provide analytic placement of neurons in a neural network description, the analytic placement to produce placed neurons;
   a smoothing module to perform diffusion-based smoothing of the placed neurons;
   a legalization module to adjust locations of the placed neurons following the diffusion-based smoothing to correspond to legal locations of neuromorphic neurons within a neural fabric; and
   a simulated annealing module to refine locations of the placed neurons within the neural fabric using simulated annealing following location adjustment by the legalization module,
   wherein one or both of the neural fabric and the neuromorphic neuron within the neural fabric comprises a physical circuit, the neural fabric being configured to implement a synaptic time-multiplexed (STM) neuromorphic network.

2. The neuromorphic compiler of claim 1, wherein the placement module comprises an input/output (I/O) assignment sub-module to assign locations of I/O neurons, a spring force adjustment sub-module to perform a spring force adjustment, a conjugate gradient solver, and a synaptic pathway length analyzer, the placement module to iteratively employ each of the I/O assignment sub-module, the spring force adjustment sub-module, the conjugate gradient solver and the synaptic pathway length analyzer to provide analytic placement of the neurons in the neural fabric in which synaptic pathways are interpreted as springs that connect between connection points represented by the placed neurons.

3. The neuromorphic compiler of claim 1, wherein diffusion-based smoothing performed by the smoothing module is to spread out the placed neurons according to a local density gradient associated with the placed neurons.

4. The neuromorphic compiler of claim 1, wherein the legalization module implements an iterative, quad-tree structured legalization.

5. The neuromorphic compiler of claim 1, wherein one or more of the placement module, the smoothing module, the legalization module and the simulated annealing module comprise instructions stored in a non-transitory, computer readable medium.

6. The neuromorphic compiler of claim 1, wherein the neural fabric comprises a plurality of nodes interconnected by a plurality of switches that provide selectable synaptic pathways between the nodes, a node of the neural fabric comprising a neuromorphic neuron having an output connected to an output of the node and a synapse connected between an input of the node and an input of the neuromorphic neuron to provide an input signal to the neuromorphic neuron during a STM cycle, wherein the synapse is to implement spike timing dependent plasticity (STDP), and wherein each of placed neurons corresponds to a different node of the neural fabric.

7. The neuromorphic compiler of claim 1, further comprising a connection router to route connections between the placed neurons within the neural fabric following simulated annealing by the simulated annealing module, the connection router to route connections between selected nodes within the neural fabric according to connections defined in the neural network description, wherein the selected nodes correspond to the placed neurons, and wherein the routed connections represent connections defined by switch states of switches of the neural fabric during an STM time slot of an STM cycle.

8. The neuromorphic compiler of claim 7, wherein the connection router is to:
   attempt to route connections between pairs of nodes, a successfully routed connection defining a synaptic pathway between a pair of nodes in a first time slot the STM cycle; and
   repeat an attempt to route connections for each node pair in which attempting to route connections failed to produce a defined synaptic pathway between the nodes of the pair,
   wherein a successfully routed connection produced by repeating an attempt to route connections defines a synaptic pathway between the nodes of the pair in a second STM time slot of the STM cycle.

9. A neuromorphic system comprising the neuromorphic compiler of claim 1, the neuromorphic system further comprising:
   the neural fabric comprising nodes interconnected by switches that provide selectable synaptic pathways between the nodes; and
   a memory to store a configuration of the switches corresponding to a STM time slot of a STM cycle.

10. A synaptic time multiplexing (STM) neuromorphic system comprising:
    a neural fabric having a plurality of nodes interconnected by a plurality of switches that provide selectable synaptic pathways between the nodes; and
    a neuromorphic compiler comprising:
       a placement engine to provide mapping of neurons of a neural network description into the nodes of the neural fabric, the mapping to minimize an average synaptic pathway length;
       a connection router to provide routing of connections between mapped neurons to implement a neural network described in the neural network description as an STM neuromorphic network, wherein routed connections are to be both distributed among a plurality of time slots of the STM neuromorphic network and implemented by switch states of the switches of the neural fabric; and
       a non-transitory memory to store the switch states of the switches of the neural fabric, the switch states being associated with an STM time slot of an STM cycle of the STM neuromorphic network.

11. The STM neuromorphic system of claim 10, wherein the placement engine of the neuromorphic compiler is to provide analytic placement of the neurons, to perform diffusion-based smoothing of the analytically placed neurons, to provide legalization of the placed neurons after diffusion-based smoothing, and to perform simulated annealing of the legalized, placed neurons within the neural fabric.

12. The STM neuromorphic system of claim 10, wherein a node of the neural fabric comprises a neuromorphic neuron and a synapse, an output of the neuromorphic neuron being connected to an output of the node, the synapse being connected between an input of the node and an input of the neuromorphic neuron to provide an input signal to the neuromorphic neuron, and wherein the synapse is to implement spike timing dependent plasticity (STDP), the synapse having an input connected to the input of the node and another input connected to the output of the neuromorphic neuron.

13. A method of neuromorphic compiling of a synaptic time-multiplexed (STM) neuromorphic network, the method comprising:
    providing analytic placement of neurons in a neural network description, the analytic placement to produce placed neurons;
    performing diffusion-based smoothing of the placed neurons;
    providing legalization of the placed neurons following the diffusion-based smoothing, wherein providing legalization comprises adjusting locations of the placed neurons according to legal locations of neuromorphic neurons within a neural fabric; and
    performing simulated annealing of the placed neurons following legalization to refine placed neuron locations within the neural fabric,
    wherein the neural fabric comprises a plurality of nodes comprising neuromorphic neurons and a plurality of switches to provide selectable interconnections between the nodes to define synaptic pathways between neuromorphic neurons within an STM time slot during an STM cycle of the STM neuromorphic network.

14. The method of neuromorphic compiling of claim 13, further comprising transforming the synaptic pathway using a star model into a plurality of pair-wise connection synaptic pathways by inserting a fictitious neuron, wherein the synaptic pathway includes more than two neuromorphic neurons.

15. The method of neuromorphic compiling of claim 13, wherein a synaptic pathway between neuromorphic neurons of a pair of nodes is interpreted as a spring, the spring having a spring force proportional to a distance between the nodes, and wherein providing analytic placement comprises iteratively performing an input/output (I/O) assignment, a spring force adjustment, a conjugate gradient placement solution, and a synaptic pathway length analysis.

16. The method of neuromorphic compiling of claim 15, wherein during an iteration of the analytic placement, performing the I/O assignment comprises:
    determining a center of mass of all neurons;
    determining a center of mass of an I/O neuron pair comprising an I/O neuron and a neuron that is connected to the I/O neuron;
    finding a vector pointing from the center of mass of all neurons to the center of mass of the I/O neuron pair, an extension of the vector pointing to a new location of the I/O neuron; and
    moving the I/O neuron to the new location,
    wherein I/O neurons of I/O neuron pairs are initially spaced evenly along an I/O edge of the neural fabric prior to a first iteration.

17. The method of neuromorphic compiling of claim 15, wherein during an iteration of the analytic placement, performing the conjugate gradient placement solution comprises using a conjugate gradient method to solve an equation representing a summation of a quadratic distance between neurons of a k-th pair of neurons multiplied by a k-th spring force, the summation being over all pairs of neurons in a star model-transformed neural network description.

18. The method of neuromorphic compiling of claim 17, wherein the k-th spring force is scaled up by a scale factor $\alpha$ for a synaptic pathway length that is longer than an average synaptic pathway length of all the synaptic pathways and the k-th spring force is scaled down by a scale factor $\beta$ for a synaptic pathway length that is shorter than the average synaptic pathway length, the scale factor $\alpha$ being a positive value greater than one and the scale factor $\beta$ being a positive value less than one.

19. The method of neuromorphic compiling of claim 13, further comprising routing connections between the placed neurons within the neural fabric following simulated annealing, the routed connections being between selected nodes within the neural fabric according to connections defined in the neural network description, wherein the selected nodes comprise the placed neurons, and wherein the routed connections represent connections defined by switch states of the switches in the neural fabric during the STM time slot.

20. The method of neuromorphic compiling of claim 19, wherein routing connections comprises:
    attempting to route the connections between the placed neurons and assigning successfully routed connections to a first STM time slot of the STM neuromorphic network; and
    repeating the attempt to route connections for any connection in which the attempt to route connections failed and assigning successfully routed connections produced by the repeated attempt to route to a second STM time slot.

21. The method of neuromorphic compiling of claim 19, wherein the switch states are stored in a memory and recalled from the memory to set the switches during the STM time slot, the switch states being stored using compression to reduce an amount of the memory employed to store the switch states.

22. The method of neuromorphic compiling of claim 13, wherein a node of the neural fabric further comprises a synapse connected between a node input and an input of a neuromorphic neuron of the node, the synapse implementing spike timing dependent plasticity (STDP).

\* \* \* \* \*